(12) United States Patent
Stark et al.

(10) Patent No.: US 11,254,520 B2
(45) Date of Patent: Feb. 22, 2022

(54) CONVEYING SYSTEM AND METHOD FOR PNEUMATICALLY CONVEYING PLASTIC GRANULATE

(71) Applicant: Coperion GmbH, Stuttgart (DE)

(72) Inventors: Bernhard Stark, Fronreute (DE); Michael Dürr, Wolfegg (DE); Thomas Vögele, Binzwangen (DE)

(73) Assignee: Coperion GmbH, Stuttgart (DE)

( * ) Notice: Subject to any disclaimer, the term of this patent is extended or adjusted under 35 U.S.C. 154(b) by 0 days.

(21) Appl. No.: 16/871,688

(22) Filed: May 11, 2020

(65) Prior Publication Data

US 2021/0122587 A1 Apr. 29, 2021

(30) Foreign Application Priority Data

May 10, 2019 (EP) .................................... 19173819

(51) Int. Cl.
| | |
|---|---|
| *B65G 53/66* | (2006.01) |
| *B65G 53/52* | (2006.01) |
| *B65G 53/04* | (2006.01) |

(52) U.S. Cl.
CPC ........... *B65G 53/526* (2013.01); *B65G 53/04* (2013.01); *B65G 53/66* (2013.01); *B65G 2201/04* (2013.01); *B65G 2812/165* (2013.01)

(58) Field of Classification Search
CPC ........ B65G 51/01; B65G 51/08; B65G 53/10; B65G 53/14; B65G 53/30; B65G 53/38; B65G 53/62; B65G 53/64; B65G 53/66; B65G 2201/042; B65G 2812/1633; B65G 2812/1658; F15D 1/02; F26B 17/10;
(Continued)

(56) References Cited

U.S. PATENT DOCUMENTS

| | | | | |
|---|---|---|---|---|
| 1,598,558 A | * | 8/1926 | Cohen ..................... | B65G 53/30 406/48 |
| 2,132,656 A | * | 10/1938 | Smith ...................... | F26B 21/06 34/537 |

(Continued)

FOREIGN PATENT DOCUMENTS

| | | |
|---|---|---|
| EP | 0990606 A2 | 4/2000 |
| EP | 3366618 A1 | 8/2018 |

(Continued)

OTHER PUBLICATIONS

EP 19 173 819.4 International Search Report dated Nov. 19, 2019.
(Continued)

*Primary Examiner* — Joseph A Dillon, Jr.
(74) *Attorney, Agent, or Firm* — Wood Herron & Evans LLP

(57) ABSTRACT

A conveying system for pneumatically conveying plastic granulate comprises a feed location, at which the plastic granulate is fed into a conveying line by pressurized conveying gas, a target location, in conveying connection with the feed location, for moisture contained in the conveying gas, and a condensation tempering unit, which is arranged along a section or sections of the conveying line, for making the conveying line such temperature to at least partial condensation of moisture contained in the conveying gas to form a sliding film on an internal wall of the conveying line.

20 Claims, 10 Drawing Sheets

(58) Field of Classification Search
CPC ...... F26B 17/106; F26B 17/107; F26B 21/08;
F26B 21/083; F26B 21/086
USPC .... 406/12, 47, 48, 92, 93, 94, 95, 144, 198;
34/545, 546, 576, 579, 580, 588, 359,
34/362, 364, 369, 372, 373, 374, 365
See application file for complete search history.

(56) References Cited

U.S. PATENT DOCUMENTS

| | | | | | |
|---|---|---|---|---|---|
| 2,276,805 | A | * | 3/1942 | Tolman, Jr. | B65G 53/60 406/172 |
| 3,190,867 | A | * | 6/1965 | Oldweiler | C08L 23/02 34/360 |
| 3,384,420 | A | * | 5/1968 | Fiscus | B65G 53/06 406/173 |
| 3,621,585 | A | * | 11/1971 | Robertson | F26B 17/14 34/375 |
| 3,751,214 | A | * | 8/1973 | Wenzel | B65G 53/06 432/15 |
| 4,016,894 | A | * | 4/1977 | Baldwin | B65G 53/30 137/13 |
| 4,023,280 | A | * | 5/1977 | Schora | B01J 8/003 34/364 |
| 4,085,976 | A | * | 4/1978 | Edwards | B65G 53/14 406/94 |
| 4,106,210 | A | * | 8/1978 | Jukkola | B01J 8/0015 34/360 |
| 4,527,342 | A | * | 7/1985 | Li | F28C 3/16 34/364 |
| 4,697,962 | A | * | 10/1987 | Dunbar | B65G 53/12 406/15 |
| 5,042,169 | A | * | 8/1991 | Vero | B29B 13/065 34/591 |
| 5,094,011 | A | * | 3/1992 | Graff | B29B 13/065 34/364 |
| 5,156,498 | A | * | 10/1992 | Nomura | C01B 33/18 406/48 |
| 5,205,991 | A | * | 4/1993 | Avery | B28B 11/243 422/129 |
| 5,248,222 | A | * | 9/1993 | Littman | B65G 53/22 406/142 |
| 5,447,394 | A | * | 9/1995 | Shepard | B65G 53/30 406/109 |
| 5,487,225 | A | * | 1/1996 | Downie | B29B 13/065 34/473 |
| 5,685,640 | A | * | 11/1997 | Goedicke | B01F 13/0255 222/195 |
| 6,024,111 | A | * | 2/2000 | Stark | B65G 53/30 137/1 |
| 6,052,919 | A | * | 4/2000 | Stark | B29B 9/16 34/304 |
| 6,079,911 | A | * | 6/2000 | Wangermann | A01M 7/0092 406/122 |
| 6,321,461 | B1 | * | 11/2001 | Ogasahara | F26B 3/343 34/168 |
| 6,415,528 | B2 | * | 7/2002 | Holler | F26B 9/063 165/104.16 |
| 6,582,161 | B2 | * | 6/2003 | Noguki | B65G 53/526 406/197 |
| 7,021,870 | B2 | * | 4/2006 | Gille | B01J 8/0025 406/152 |
| 7,144,204 | B2 | * | 12/2006 | Hilgraf | B65G 53/20 406/95 |
| 7,790,840 | B2 | * | 9/2010 | DeBruin | B29B 9/16 528/480 |
| 8,075,227 | B2 | * | 12/2011 | Yuan | B01J 8/003 406/93 |
| 8,360,691 | B2 | * | 1/2013 | Moretto | B65G 53/66 406/17 |
| 8,410,223 | B2 | * | 4/2013 | Matsumoto | C08J 3/12 525/330.2 |
| 8,801,339 | B2 | * | 8/2014 | Durr | B65G 53/525 406/95 |
| 9,096,732 | B2 | * | 8/2015 | Nogi | C08J 3/075 |
| 9,175,142 | B2 | * | 11/2015 | Nogi | C08F 6/008 |
| 10,112,333 | B2 | * | 10/2018 | Thorn | A23P 30/20 |
| 10,647,527 | B2 | * | 5/2020 | Stark | B65G 53/10 |
| 10,815,078 | B2 | * | 10/2020 | Stark | B65G 53/60 |
| 10,894,671 | B2 | * | 1/2021 | Miki | H01M 4/0471 |
| 2001/0046420 | A1 | * | 11/2001 | Noguki | B65G 53/526 406/197 |
| 2005/0091872 | A1 | * | 5/2005 | Graeff | F26B 21/12 34/359 |
| 2007/0274789 | A1 | * | 11/2007 | DeBruin | B29B 9/06 406/197 |
| 2010/0101107 | A1 | * | 4/2010 | Kowoll | C10L 5/04 34/368 |
| 2010/0119312 | A1 | * | 5/2010 | Nagashima | B01J 20/267 406/46 |
| 2011/0028670 | A1 | * | 2/2011 | Matsumoto | C08F 6/008 526/317.1 |
| 2011/0088806 | A1 | * | 4/2011 | Nogi | C08J 3/245 141/1 |
| 2011/0110730 | A1 | * | 5/2011 | Nogi | C08J 3/12 406/197 |
| 2011/0142553 | A1 | * | 6/2011 | Durr | B65G 53/525 406/86 |
| 2011/0299943 | A1 | * | 12/2011 | Woolever | B65G 53/66 406/14 |
| 2012/0213876 | A1 | * | 8/2012 | Stark | F01K 25/10 425/10 |
| 2012/0301229 | A1 | * | 11/2012 | Yorio | B65G 49/08 406/88 |
| 2014/0084504 | A1 | * | 3/2014 | Christel | C08G 63/88 264/11 |
| 2016/0251172 | A1 | * | 9/2016 | Kraemer | B65G 53/06 406/106 |
| 2016/0304295 | A1 | * | 10/2016 | Thorn | B29C 48/03 |
| 2018/0244482 | A1 | | 8/2018 | Stark et al. | |
| 2018/0305140 | A1 | | 10/2018 | Stark et al. | |
| 2020/0197847 | A1 | * | 6/2020 | Jantes | B04C 5/04 |
| 2021/0053019 | A1 | * | 2/2021 | Laurell | B01J 8/0015 |

FOREIGN PATENT DOCUMENTS

| | | |
|---|---|---|
| EP | 3401248 A1 | 11/2018 |
| JP | H0379514 A | 4/1991 |
| WO | 2019201721 A1 | 10/2019 |

OTHER PUBLICATIONS

Morphology, evaporation and condensation of liquids on wetting-structured surfaces, Dissertation by Claudia Schaefle with English Abstract, Jan. 2002.

* cited by examiner

CONVEYING SYSTEM AND METHOD FOR PNEUMATICALLY CONVEYING PLASTIC GRANULATE

CROSS-REFERENCES TO RELATED APPLICATIONS

This application claims the priority of European Patent Application, Serial No. 19 173 819.4, filed May 10, 2019, pursuant to 35 U.S.C. 119(a)-(d), the content of which is incorporated herein by reference in its entirety as if fully set forth herein.

FIELD OF THE INVENTION

The invention relates to a conveying system and to a method for pneumatically conveying plastic granulate.

BACKGROUND OF THE INVENTION

EP 3 366 618 A1 discloses a conveying system for conveying plastic granulate, wherein liquid for humidifying the conveying gas and/or the plastic granulate to be conveyed is added along a conveying line in order to improve the conveying conditions.

SUMMARY OF THE INVENTION

It is an object of the present invention to further improve the conveying conditions for a conveying system of this kind.

According to the invention, this object is achieved by a conveying system for pneumatically conveying plastic granulate by means of humid conveying gas, having a feed location, at which the plastic granulate is fed into a conveying line by pressurized conveying gas, and a target location in conveying connection with the feed location, comprising a condensation tempering unit, which is arranged along a section or sections of the conveying line, for making the conveying line such temperature for the at least partial condensation of moisture contained in the conveying gas to form a sliding film on an internal wall of the conveying line.

According to the invention, this object is further achieved by a method for pneumatically conveying plastic granulate, which is conveyed by means of a humid conveying gas along a conveying line from a feed location to a target location, wherein the humid conveying gas is supersaturated at least in some region or regions along the conveying line during conveyance, wherein making the conveying line in some section or sections by means of a condensation tempering unit such temperature to form a sliding film on an internal wall of the conveying line by condensing moisture out of the conveying gas.

According to the invention, it has been recognized that moisture contained in the conveying gas can be selectively condensed for improved conveying conditions, at least along a section of a conveying line. At least partial condensation of the liquid enables a liquid film to form on an internal wall of the conveying line. The liquid film serves as a sliding film for the plastic granulate. By means of the sliding film, the friction of the particles of the plastic granulate on the internal wall of the conveying line is reduced. The required conveying pressure for pneumatically conveying the plastic granulate is reduced. Pneumatic conveyance can thereby be carried out with improved process stability and, in particular, while reducing conveying pressure peaks. The occurrence of abrasion on the plastic granulate is reduced and, in particular, prevented.

In particular, the conveying line is a pipeline, wherein the pipeline has, in particular, a circular internal cross section. Other cross-sectional configurations are also conceivable.

An essential insight of the invention is that the sliding film can be set selectively by means of a condensation tempering unit by selectively controlling the temperature of the conveying line. The condensation tempering unit can be embodied in an active and/or passive manner, i.e. can have active and/or passive elements. The condensation tempering unit is arranged along a section or sections of the conveying line. In particular, the condensation tempering unit is arranged along a front section of the conveying line. In particular, the condensation tempering unit is arranged in the region of a feed location or adjacent to the feed location, at which the plastic granulate is fed into the conveying line by pressurized conveying gas. In particular, the condensation tempering unit extends, in particular starting from the feed location, along the conveying line over at least 20% of the total length of the conveying line, in particular over at least 40% of the total length of the conveying line, in particular over at least 50% of the total length of the conveying line, in particular over at least 70% of the total length of the conveying line and, in particular, over at least 90% of the total length of the conveying line. It is also conceivable for the condensation tempering unit to be arranged along the entire length of the conveying line. It is also conceivable for the condensation tempering unit to be formed at a distance from the feed location and, in particular, at a distance from the target location on the conveying line.

The plastic granulate conveyed can have been produced in a preceding granulation process. In a crystallisation process following granulation, the structure of the polymer can be modified. The plastic granulate produced in this way is conveyed in the conveying system from the feed location to the target location. Additional production steps or processing steps for preparing the plastic granulate are not required, particularly within the conveying system. The plastic granulate is available in fully finished form at the feed location. The plastic granulate has an equivalent particle diameter of 2 mm to 5 mm of a sphere of the same volume.

Polyolefins, in particular polyethylene (PE) or polypropylene (PP), or industrial plastics, in particular polycarbonate (PC) or a polyethylene terephthalate (PET), are used as plastic granulates, for example. According to the invention, it has been recognized that the resulting conveying conditions in the conveying system are influenced by the bulk properties of the respective plastic granulate. The bulk properties are dependent, in particular, on the respectively added additives in the plastic granulate, which can be soft, hard, brittle or crumbly, and therefore the characteristic friction behaviour varies from sliding very readily to almost sticky and/or the moisture behaviour varies from moisture-repellent, moisture-absorbing, only superficial moisture and/or moisture penetrating into the granulate particles, and the respective drying behaviour has different characteristics for the various plastics materials. By virtue of the selective adjustability of the sliding film, the respective conveying conditions in the conveying system can be set selectively and in a manner adapted to the respective plastics material.

Air, in particular, is used as the conveying gas.

Humid conveying gas in the sense according to the invention should be interpreted to mean conveying gas with a relative humidity of at least 60% and at most 200%. In this context, the relative humidity is defined as the ratio of the mass of the vapour of the liquid contained in the conveying gas to the maximum mass of vapour of this liquid which the conveying gas can absorb under the given conditions of pressure and temperature. At a relative humidity of 100%, therefore, there is complete saturation of the conveying gas with the liquid. A further addition of liquid leads to supersaturation of the conveying gas. In particular, it is possible to supersaturate the conveying gas with the liquid along the conveying line in order to promote the condensing of the liquid on the internal wall of the conveying line.

A target location of the conveying system should be interpreted, in particular, to mean a region in which the plastic granulate is packed and/or loaded into a packaging receptacle or a transport receptacle. A transport receptacle can be a transportable receptacle, e.g. a container. In particular, at least one target receptacle is provided at the target location in order to allow temporary storage of the conveyed plastic granulate at the target location. In this sense, a target receptacle is a stationary or mobile receiver in which the plastic granulate can be stored at least temporarily, in the medium term or over the long term. A target receptacle is, in particular, a storage silo. A target receptacle has a holding volume of at least 1 $m^3$, in particular at least 100 $m^3$ and in particular at least 1000 $m^3$, for example. However, a target receptacle can also be a receptacle that can be transported on a vehicle, in particular for a lorry or a rail vehicle.

Tests by the applicant have shown that a cool ambient temperature, which in particular brings about a low temperature at the internal wall of the conveying line, promotes the deposition of condensate from the flow of the humid conveying gas on the internal wall of the conveying line. This wall condensation allows an additional and very effective transport mechanism for the moisture. In particular, this transport mechanism acts as a film, streaks and/or droplets in addition to the flow of the liquid. The liquid is typically transported by entrainment with the plastic granulate. The wall condensation promotes the distribution of the moisture over the inner circumference of the conveying line and along the length of the conveying line. The liquid which is taken along in any case is used more effectively. The conveying conditions are improved.

In particular, the conveying system is used for pneumatic conveyance by suspended conveyance or conveyance in strands. In the case of suspended conveyance or conveyance in strands, the speed of the conveying gas is relatively high, in particular higher than in the case of conveyance in plugs, and is, in particular, at least 10 m/s, in particular at least 12 m/s, in particular at least 14 m/s, in particular at least 16 m/s, in particular at least 18 m/s, in particular at least 20 m/s, in particular at least 22 m/s and, in particular, at least 25 m/s, in each case relative to the empty conveying line. The loading, i.e. the ratio of plastic granulate to conveying gas, is, in particular, less than 30 kg/kg, in particular less than 25 kg/kg, in particular less than 20 kg/kg, in particular less than 15 kg/kg, in particular less than 12 kg/kg and, in particular, less than 10 kg/kg.

A conveying system, in which the conveying line is embodied without the condensation tempering unit along a target section adjacent to the target location and/or has an evaporation tempering unit for making the conveying line in the target section such temperature to avoid condensate on the internal wall of the conveying line, wherein, in particular, the target section has a target section length such that a conveying pressure difference along the target section is at most 30% of a total conveying pressure, allows the selective suppression and/or avoidance of condensate formation in a target section of the conveying line. This is achieved by virtue of the fact that the conveying line is embodied without the condensation tempering unit along the target section.

In addition or as an alternative, an evaporation tempering unit can be provided along the target section in order to prevent condensate formation. It has been found that, owing to the residual heat in the plastic granulate for example, the liquid which is on the internal wall of the conveying line and/or on the plastic granulate, for example, may evaporate. The risk that the moisture will get as far as the target location and, in particular, into the at least one target receptacle is thereby reduced and, in particular, prevented. The evaporation tempering unit can have active and/or passive elements, e.g. an insulating layer with heating, in particular electric heating, a double tube apparatus with a heat transfer liquid, an infrared radiant heater in the interior of the conveying line for selective heat input to the internal wall of the conveying line and/or heating of the conveying line by means of Peltier elements. The target section has, in particular, a target section length such that a conveying pressure difference along the target section is at most 30% of a total conveying pressure. In particular, the conveying pressure difference along the target section is at most 20% of the total conveying pressure and, in particular, at most 10% of the total conveying pressure.

At least one passive element, which, in particular, is embodied as a shading element, as a passive cooling element and/or as a thermal insulating element, for the condensation tempering unit allows an inexpensive embodiment. The expenditure on apparatus to provide the condensation tempering unit is low. A passive element is, in particular, a shading element, which is arranged above the conveying line and provides protection from environmental influences such as solar radiation, wind and precipitation such as rain, hail and/or snow. The shading element can be embodied as a roof installed in a fixed manner, in particular as a gabled roof or as a single-pitch roof. A shading element can also be implemented by means of textile elements in the form of tarpaulins. The passive shading element can be embodied in a manner which allows variable arrangement, with the slope angle of the roof surface relative to the conveying line being variable, for example.

In addition or as an alternative, a textile shading element can be embodied in such a way that it can be rolled in or out in order, in particular, to variably set the size of the shaded area, in particular the length section of the conveying line which is shaded.

In addition or as an alternative, the condensation tempering unit can have a thermal insulating element, which is mounted, in particular, as a thermal insulation layer on an outer side of the conveying line. In particular, the thermal insulating element extends along the entire outer circumference or at least over 300° in the circumferential direction of the longitudinal axis of the conveying line, in particular at least 270°, in particular at least 225° and, in particular, at least 180°.

The thermal insulating element is, in particular, produced from an insulating material, e.g. mineral wool. Mineral wool is used, in particular, for thermal insulation. It is advantageous if the insulating material for thermal insulation has a thermal conductivity of 0.02 W/mK to 0.06 W/mK.

For insulation against the cold, polystyrene foam (XPS) and/or polyurethane (PUR) can be used as insulating material, for example. The insulating materials for insulation against the cold advantageously have a thermal conductivity in a range of from 0.02 W/mK to 0.05 W/mK. The thermal insulation layer advantageously has a layer thickness of from 30 mm to 150 mm. The layer thickness of the thermal insulation layer depends, in particular, on the temperature of the plastic granulate and/or on the diameter of the conveying line.

Tests by the applicant have shown that it is advantageous to selectively omit thermal insulating elements from certain sections of the conveying line. It is advantageous, in particular, if pipe bends of the conveying line are embodied without thermal insulating elements to enable frictional heat between the granulate particles and the pipeline internal wall to be dissipated more effectively to the environment.

In addition or as an alternative, a passive element can also be a passive cooling element, e.g. in the form of cooling fins, which are arranged statically on an outer side of the conveying line. Via the cooling fins, heat can be dissipated from the conveying line to the environment in an effective and simplified manner.

At least one active element, which, in particular, is embodied as an active heating element and/or as an active cooling element, of the condensation tempering unit enables the temperature at the internal wall of the conveying line to be influenced directly. An active element promotes selective temperature control of the conveying line. In particular, it is possible for the temperature at the internal wall of the conveying line to be selectively set and, in particular, for a setpoint temperature, in particular a setpoint temperature range, to be maintained. An active element is, for example, an active cooling element, especially in the form of a cooling unit and/or a heat exchanger.

In addition or as an alternative, an active element can be embodied as a heating element.

In particular, an active element is embodied as a heat exchanger. A heat exchanger can be embodied in some section or sections as a double tube apparatus with an additional tube which surrounds the conveying line on the outside. An interspace, through which a heat transfer fluid, in particular a liquid, in particular water, flows, is formed between the internal wall of the additional tube and the external wall of the conveying line. The heat exchanger can be used to heat or to cool the conveying line, depending on the temperature of the heat transfer fluid.

In particular, the additional tube has a cross-sectional contour which corresponds to the contour of the conveying line. In particular, the additional tube is arranged concentrically with the conveying line. In particular, the interspace is embodied in a ring shape. The clearance between the internal wall of the additional tube and the external wall of the conveying line is constant along the circumference of the interspace.

In particular, the double tube apparatus is operated as a countercurrent apparatus. This means that the direction of flow of the heat transfer fluid is directed counter to the conveying direction of the conveying gas. This ensures that the cooling at the beginning of the double tube apparatus is most effective when pressure-induced supersaturation of the conveying gas is at its lowest. It is also conceivable to operate the double tube apparatus as a co-current apparatus. It is also possible, in particular, to use a temperature control oil as a heat transfer fluid. The double tube apparatus can be used for active cooling or for active heating.

If the active cooling element is embodied as a double tube apparatus with cooling liquid, it can advantageously be connected to a cooling water network. This enables the active cooling element to be operated in an uncomplicated and inexpensive manner.

It is conceivable to operate the active elements at different heat transfer fluid temperatures, i.e. at different cooling liquid temperatures or at different hot water or temperature control oil temperatures, in different sections along the conveying line. The various heat transfer fluid temperatures allow variable adaptation and setting of the temperature at the internal wall of the conveying line, section by section.

A control unit for controlling the temperature at the internal wall of the conveying line for the formation of a sliding film, wherein the control unit is in signal communication, in particular, with the condensation tempering unit and with at least one temperature sensor and/or with a sensor for humidity measurement in the conveying line and/or in a pressurized gas line, increases the reliability of the conveying conditions with the conveying system. By virtue of the fact that the temperature at the internal wall of the conveying line can be set selectively and can be held reliably in a desired setpoint temperature range, selective formation and maintenance of the sliding film is possible. It is advantageous if a plurality of temperature sensors is provided in order, in particular, to measure the ambient temperature, the temperature at the internal wall of the conveying line and the temperature in the conveying line. In addition, a sensor is provided in order to measure the moisture content in the conveying line and/or in a pressurized gas line. The pressurized gas line is, in particular, connected to the feed location and is used to feed the conveying gas into the conveying line under pressure. These sensors are in signal communication with the control unit. The measured values transmitted by the sensors are used as input variables, in particular as manipulated variables for the control process. In particular, the control unit is in signal communication with the condensation tempering unit, in particular with the at least one passive element and/or with the at least one active element for selective temperature control of the conveying line and hence for control of the temperature at the internal wall of the conveying line.

A distribution unit for the selective distribution of the sliding film formed on the internal wall of the conveying line, wherein the distribution unit is arranged, in particular, in the region of the condensation tempering unit, allows the advantageous use of the sliding film since the sliding film is distributed selectively on the internal wall of the conveying line. In particular, at least one distribution unit is provided. It is possible for a plurality of distribution units to be arranged along the conveying line, in particular in series and, in particular, spaced apart. The selective arrangement of the distribution units enables the conveying conditions along the conveying line to be set selectively, section by section.

Embodiments of the distribution unit, in which the distribution unit has at least one swirl vane for generating swirl in the conveying flow, wherein the at least one swirl vane is arranged within the conveying line, in particular along a rectilinear, in particular a horizontally oriented, section of the conveying line, and in which the distribution unit has at least one deflection element for deflecting a fluid flow in the conveying line, wherein the at least one deflection element is embodied, in particular, as a baffle, which is secured, in particular, on the internal wall of the conveying line, and/or is embodied as a guide groove, which is embodied, in particular, in a manner integrated on the internal wall of the conveying line, wherein the guide groove is embodied, in particular, as an impressed feature on the internal wall, and in which the distribution unit has at least one gas injection element, which is connected to the conveying line for the additional injection of a gas for the distribution of the sliding film, and in which, in particular in the region of the distribution unit, the internal wall of the conveying line is embodied with a hydrophilic wetting surface, which, in particular, has a contact angle that is less than 90°, in particular less than 50°, in particular less than 30°, in particular less than 10°, have proven particularly advantageous in respect of the formation and/or maintenance of the sliding film.

A hydrophilic wetting surface according to the invention can be embodied on all sections of the internal wall of the conveying line, in particular section by section and, in particular, in sections in which no distribution unit is provided.

A humidification unit for humidifying the conveying gas and/or the plastic granulate by adding liquid, in particular by means of a separate liquid connection, simplifies the addition of liquid, in particular water. The humidification unit is used to humidify the conveying gas and/or the plastic granulate. By means of the humidification unit, it is possible, in particular, to add such a quantity of liquid to the plastic granulate and/or to the conveying gas that the conveying gas is supersaturated with the liquid at least in some region or regions along the conveying line during conveyance. As a liquid for humidifying the conveying gas and/or the plastic granulate, use is made, in particular, of water, in particular demineralized water. The humidification unit comprises, in particular, a separate liquid connection in order to add the liquid directly to the conveying gas and/or to the plastic granulate. It is possible to provide a plurality of humidification units, which are arranged, in particular, along the conveying path, in particular on the conveying line. In addition or as an alternative, it is possible for the humidification unit to be formed integrally by adding already moist plastic granulate to the conveying gas, thus ensuring the preconditions for pneumatic conveyance with the addition of moisture. In this case, a supply of liquid from a separate liquid connection may be unnecessary. As moist plastic granulate, it is possible, in particular, to use a granulated polyolefin which has not been dried or has been dried only incompletely, in particular by mechanical dewatering, after underwater granulation. The expenditure on apparatus for humidification is reduced by the use of moist plastic granulate.

The method according to the invention exploits the insight that the formation of a sliding film on the internal wall of the conveying line can be set by selective temperature control.

A method, in which a temperature at the internal wall of the conveying line is set in accordance with a temperature of the conveying flow, wherein, in particular: $T_{IW}-T_F=-100\ K\ldots+30\ K$, in particular $T_{IW}-T_F=-30\ K\ldots 0\ K$ and, in particular, $T_{IW}-T_F=-15\ K\ldots 0\ K$, wherein, in particular, the temperature at the internal wall of the conveying line is controlled by means of a control unit, wherein the control unit is in signal communication, in particular with the condensation tempering unit and with at least one temperature sensor and/or with a sensor for humidity measurement in the conveying line, ensures a temperature range which is particularly advantageous for the conveying conditions. It was recognized that the temperature at the internal wall of the conveying line, on the one hand, and the temperature of the conveying flow influence the formation of the sliding film. The temperature of the conveying flow is a blended temperature comprising the temperature of the conveying gas and the temperature of the plastic granulate. It has been found that a temperature gradient of the temperature of the conveying flow, i.e. within the conveying line, relative to the temperature at the internal wall of the conveying line is advantageous if it is in a range of from −100 K to +30 K. At a temperature of the conveying flow of, for example, 150° C., the advantageous temperature range at the internal wall of the conveying line is 50° C. to 180° C. A temperature range for the temperature at the internal wall of the conveying line of from 30° C. less than the temperature of the conveying flow to the value of the temperature of the conveying flow and, in particular, a temperature range of from 15° C. less than the temperature of the conveying flow to the value of the temperature of the conveying flow have proven particularly advantageous.

Control of the temperature at the internal wall of the conveying line allows reliable formation of a sliding film.

A method, in which the temperature ($T_{IW}$) at the internal wall of the conveying line is set along a target section, adjacent to the target location, of the conveying line without the condensation tempering unit and/or by means of an evaporation tempering unit to avoid condensate on the internal wall of the conveying line, wherein, in particular, the target section has a target section length such that a conveying pressure difference along the target section is at most 30% of a total conveying pressure, allows reliable avoidance of condensate along a target section of the conveying line.

The addition of liquid in such a quantity to the plastic granulate and/or to the conveying gas by means of a humidification unit, in particular by means of a separate liquid connection, that the conveying gas is supersaturated with the liquid at least in some region or regions along the conveying line during conveyance, simplifies the humidification of the conveying gas and/or of the plastic granulate.

Both the features indicated in the patent claims and the features indicated in the following illustrative embodiments of the conveying system according to the invention are each suitable in isolation or in combination with one another for developing the subject matter according to the invention further. The respective combinations of features do not represent any restriction in respect of the further developments of the subject matter of the invention but are substantially of a purely illustrative character.

Further features, advantages and details of the invention will be found in the following description of illustrative embodiments with reference to the drawing.

DESCRIPTION OF THE PREFERRED EMBODIMENTS

Figure 1:
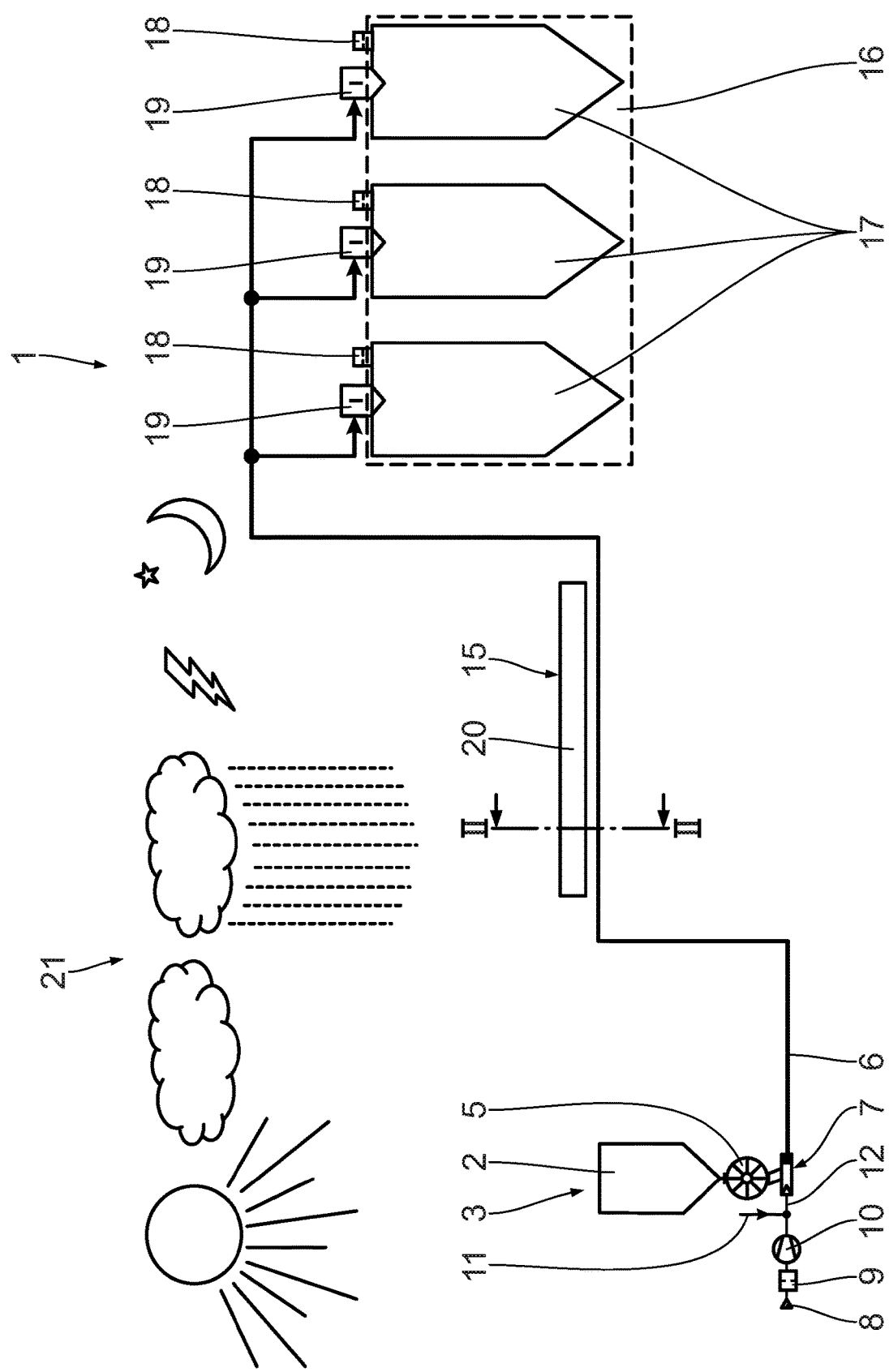
FIG. 1 shows a schematic illustration of a conveying system according to the invention having a condensation tempering unit with passive elements.
Figure 2:
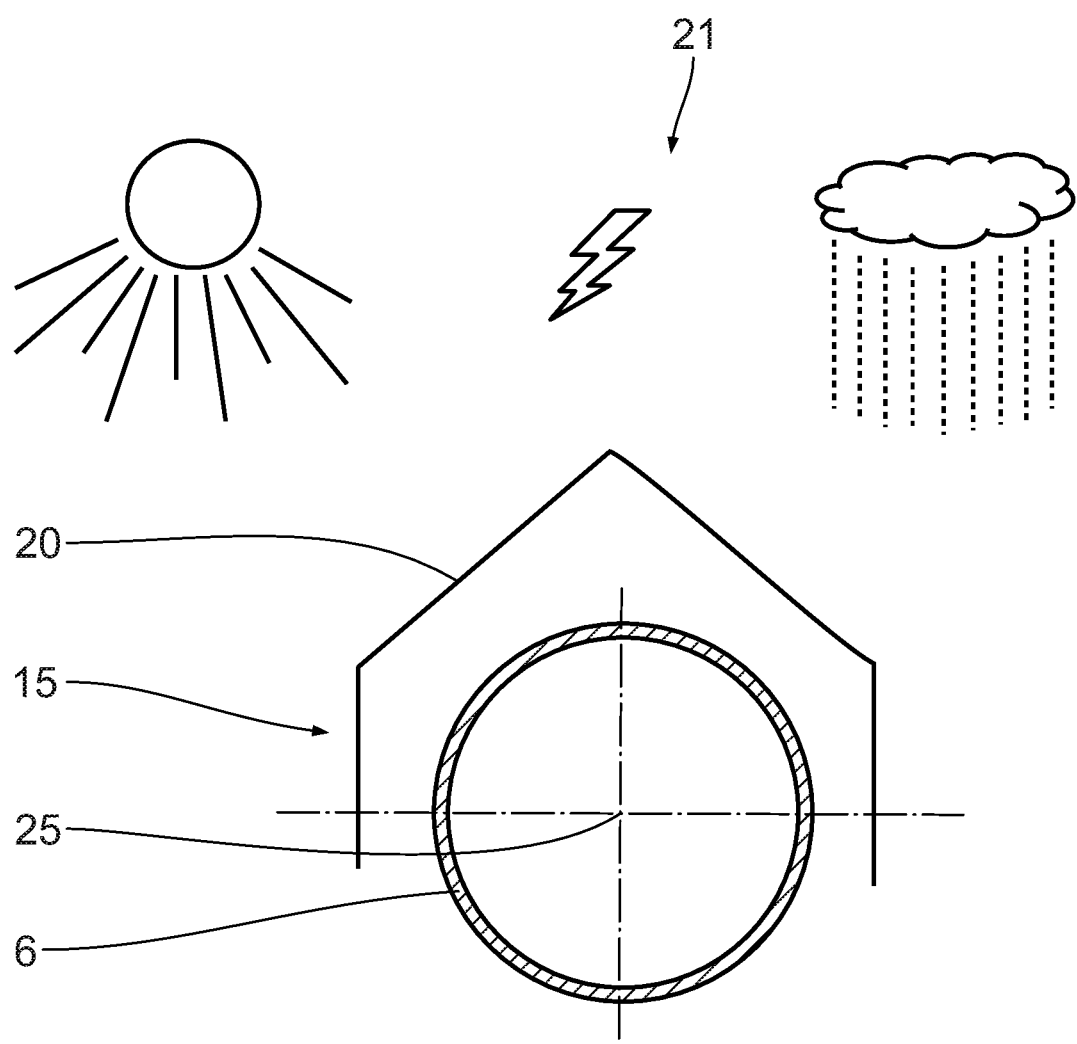
FIG. 2 shows a schematic cross-sectional illustration according to section line II-II in FIG. 1.
Figure 3:
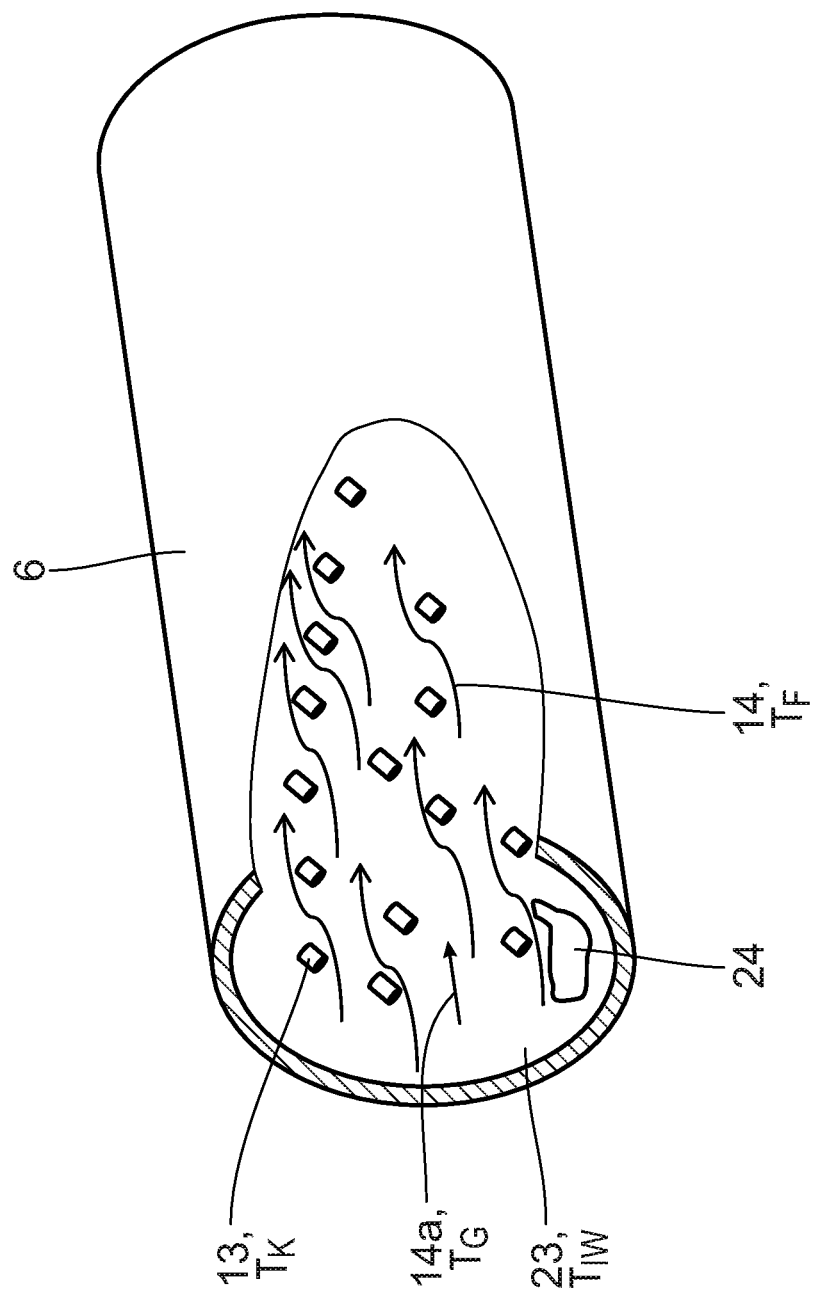
FIG. 3 shows a perspective, partially sectioned view of the pneumatic conveyance of plastic granulate in the conveying line.

A conveying system denoted overall by 1 in FIGS. 1 to 3 is used for pneumatic conveying, in particular for suspended conveyance or conveyance in strands, of plastic granulate, which is stored in a receptacle 2. The receptacle 2 is arranged at a storage location 3.

By means of a feed metering unit 5, which, according to the illustrative embodiment shown, is embodied as a rotary feeder, the plastic granulate is fed in a metered fashion from the receptacle 2 to a conveying line 6 at a feed location 7.

It is also possible to provide a plurality of receptacles 2, which are each connected to the conveying line 6 by means of a separate feed metering unit 5. However, it is also possible for the plastic granulate to arrive in pre-metered form from an upstream process, in particular in a granulation device after an extruder.

At the feed location 7, the plastic granulate fed to the conveying line 6 is supplied with pressurized conveying gas. The conveying gas is air. The conveying air is supplied from a compressed air source 8 through a filter 9 and a pressure generator 10, e.g. in the form of a compressor or of a blower.

According to the illustrative embodiment shown, a humidification unit 11 is connected to a compressed air line 12 upstream of the feed location 7.

The compressed air line 12 connects the compressed air source 8 to the feed location 7 and opens into the conveying line 6. Compressed air is transported along the compressed air line 12 as far as the liquid feed by the humidification unit 11. The compressed air is humidified by the addition of liquid and is conveyed to the feed location 7 as humid conveying gas.

The mixture of plastic granulate 13 and the humid conveying gas 14 flows along the conveying line 6. The flow direction of the mixture is characterized by the flow arrow 14a. Along the conveying line 6, the flow direction of the conveying gas 14 corresponds to the flow direction of the plastic granulate 13.

In addition or as an alternative to the humidification unit 11, at least one further humidification unit can be arranged downstream of the feed location 7, in particular along the conveying line 6. It is possible to dispense with humidification by an additional liquid feed if, for example, moist plastic granulate is conveyed, the moisture in which is used to humidify the conveying gas. In this case, the moist plastic granulate, which releases the liquid to the conveying gas, is interpreted as the humidification unit.

A condensation tempering unit 15 is arranged in a section of the conveying line 6. The condensation tempering unit 15 is arranged between the feed location 7 and a target location 16 along the conveying line 6. The target location 16 is connected to the feed location 7 in terms of conveying by means of the conveying line 6. According to the illustrative embodiment shown, three target receptacles 17 are arranged at the target location 16. Each target receptacle 17 has an exhaust air filter 18 and a feed member 19 for feeding the plastic granulate in from the conveying line 6.

According to the illustrative embodiment shown, the condensation tempering unit 15 has a passive element in the form of a shading element 20. The shading element 20 is embodied as a gabled roof. The shading element 20 protects the conveying line 6 arranged thereunder from external environmental influences 21, which are illustrated symbolically in FIG. 1. The external environmental influences 21 can cause temperature changes in the environment and/or act directly on the conveying line 6, e.g. in the form of direct solar radiation or in the form of rain on the conveying line 6. A change in the ambient temperature influences the temperature on and in the conveying line 6. Relevant environmental influences 21 are solar radiation, cloud cover, precipitation, such as rain, hail, snow, storms, thunderstorms and a change in daylight and/or seasons, for example.

According to the illustrative embodiment shown, the condensation tempering unit 15 extends along a length which is less than 20% of the total length of the conveying line 6. The total length of the conveying line 6 is obtained from the conveying path between the feed location 7 and the target location 16. The total length of the conveying line 6 corresponds to the sum of the individual lengths of the various conveying line sections. The condensation tempering unit 15 can also extend over at least 50% of the total length of the conveying line, in particular over at least 60%, in particular over at least 70%, in particular over at least 80%, in particular over at least 90% and, in particular, over the entire conveying length of the conveying line 6.

In particular, it is conceivable that the condensation tempering unit is arranged in a section of the conveying line 6 which directly adjoins the feed location 7.

In particular, an initial section of the conveying line 6 which is arranged between the feed location 7 and the start of the condensation tempering unit 15 is provided. In particular, no condensation tempering unit 15 is arranged in the initial section. The length of the initial section of the conveying line 6 is, in particular, at least 2% of the total length of the conveying line 6, in particular at least 5% of the total length of the conveying line 6, in particular at least 10% of the total length of the conveying line 6, in particular at least 20% of the total length of the conveying line 6 and, in particular, at least 50% of the total length of the conveying line 6.

According to the illustrative embodiment shown, the condensation tempering unit 15 is arranged in a region in which the conveying line 6 extends horizontally. The condensation tempering unit 15 can also be arranged in all other sections of the conveying line 6, in particular also where the conveying line 6 slopes relative to the horizontal and, in particular, where it is oriented vertically.

The pneumatic conveyance of the plastic granulate 13 in the conveying system 1 is explained in greater detail below. The plastic granulate 13 is fed into the feed location 7 of the conveying line 6 from the receptacle 2 by means of the feed metering unit 5, and is subjected to pressure with humidified conveying gas 14 via the compressed air line 12. The pressurized conveying gas 14 and the plastic granulate 13 are conveyed pneumatically along the conveying line 6 from the feed location 7 to the target receptacles 17 at the target location 16, in particular by suspended conveyance or conveyance in strands. The humidification of the conveying gas is, in particular, performed in such a way that the conveying gas is supersaturated, i.e. has a relative humidity of more than 100%. The state of saturation of the conveying gas is, in particular, dependent on the pressure and temperature in the conveying line 6.

Particularly owing to the temperature control of the conveying line 6 by means of the condensation tempering unit 15, the conveying conditions in the conveying line 6 are selectively influenced in such a way that the conveying gas is in a supersaturated state, with the result that the liquid in the conveying gas condenses. The condensed liquid is precipitated on an internal wall 23 of the conveying line 6 and forms a liquid film 24, which serves as a sliding film for the plastic granulate 13. The sliding film 24 can be formed in some section or sections along the circumference on the internal wall 23 and/or along the longitudinal axis 25 of the conveying line 6. In particular, the sliding film 24 is formed over the entire surface along the circumference of the internal wall 23.

By means of the condensation tempering unit 15, the temperature $T_{IW}$ at the internal wall 23 of the conveying line 6 can be set in an advantageous temperature range, which corresponds to between 15° K less than the temperature of the conveying flow $T_F$ and the temperature $T_F$ of the conveying flow. The temperature $T_F$ of the conveying flow is a blended temperature $T_G$ comprising that of the conveying gas 14 and the temperature TK of the plastic granulate 13.

Figure 4:
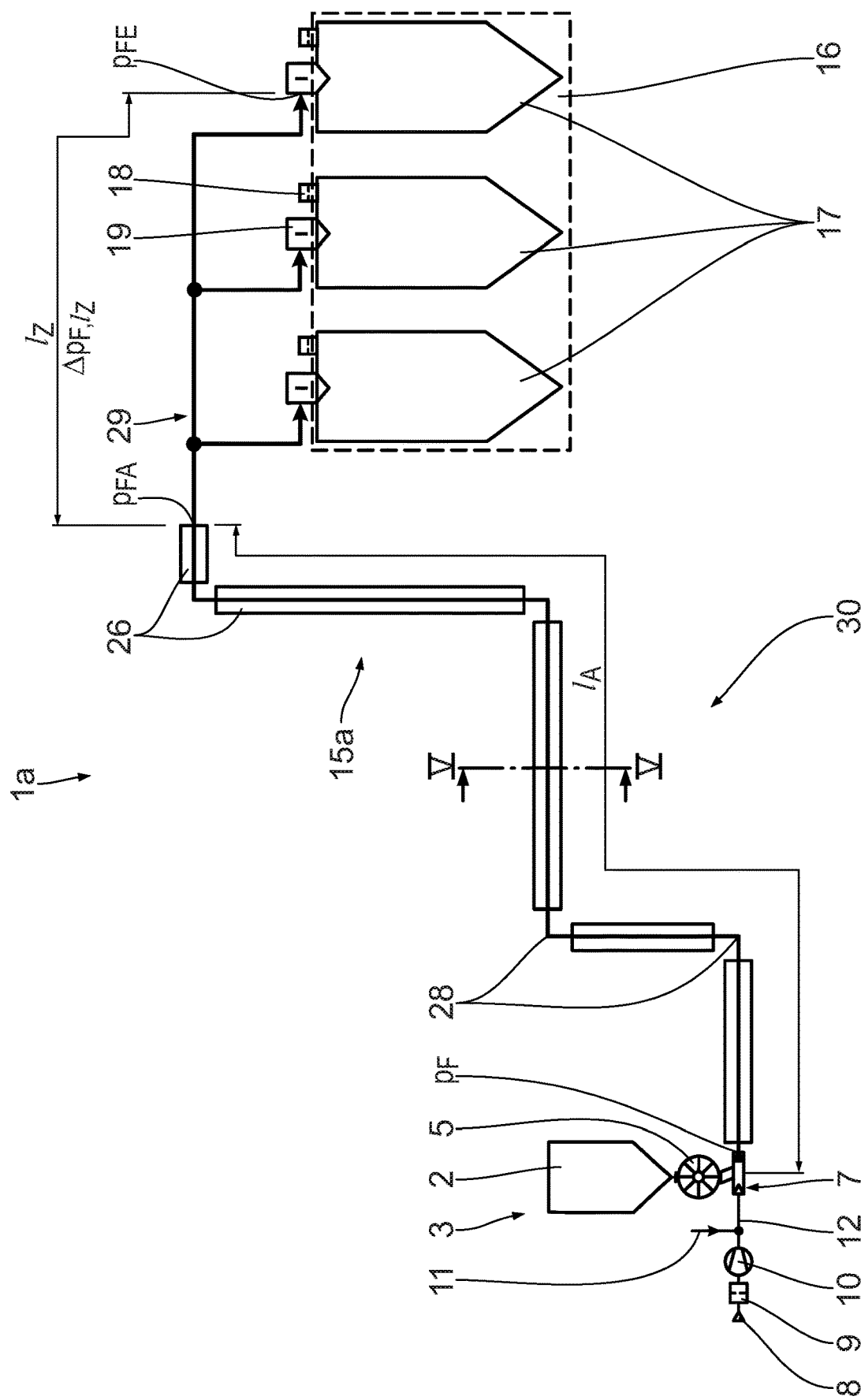
FIG. 4 shows an illustration, corresponding to FIG. 1, of a conveying system according to another embodiment having passive elements in the form of thermal insulating elements.
Figure 5:
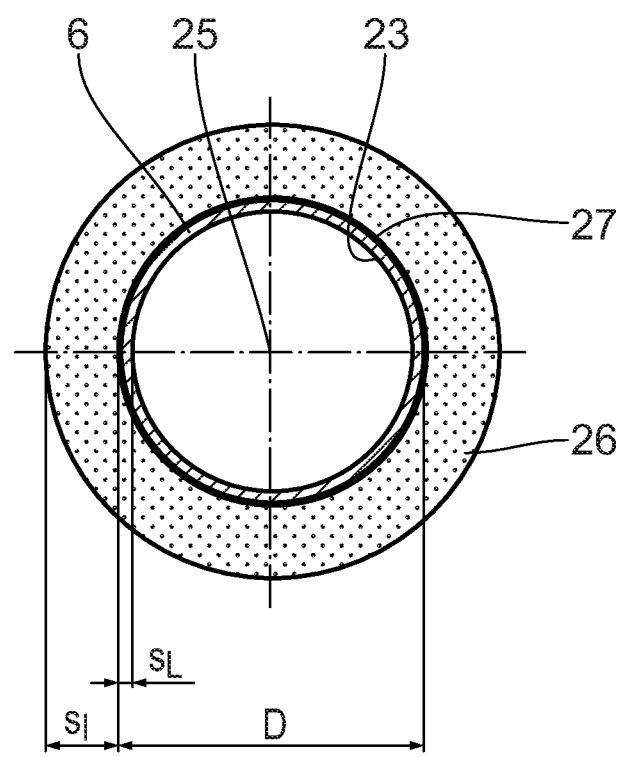
FIG. 5 shows a schematic cross-sectional illustration according to section line V-V in FIG. 4.

Another embodiment is described below with reference to FIG. 4 and FIG. 5. Parts of identical design are given the same reference signs as in the previous embodiment, to the description of which attention is drawn herewith. Parts that are different in design but functionally similar are given the same reference signs followed by a.

One difference is that the condensation tempering unit 15a has a plurality of passive elements, which, according to the illustrative embodiment shown, are each embodied as thermal insulating elements 26. The thermal insulating elements 26 are formed separately from one another. The thermal insulating elements 26 are embodied in an identical way, apart from their length. Depending on the temperature control to be achieved, it is conceivable to provide thermal insulating elements of different designs, which develop different thermal insulating effects, i.e. different temperature control effects, along the conveying line 6.

According to the illustrative embodiment shown, the thermal insulating element 26 is embodied as an insulating layer in the form of an annular cylinder, which is arranged around the entire circumference of the conveying line 6 on an external wall 27 arranged opposite the internal wall 23. It is also conceivable for the thermal insulating element 26 to be embodied as an insulating layer which extends only over a certain region or regions along the outer circumference of the conveying line 6. The insulating layer can consist of a plurality of layer sections, which are arranged along the outer circumference on the external wall 27 of the conveying line 6.

According to the illustrative embodiment shown, the insulating layer 26 has a layer thickness $s_I$ which, in particular, is greater than the wall thickness $s_L$ of the conveying line 6. In particular: $s_I \geq 5 \cdot s_L$, in particular $s_I \geq 10 \cdot s_I$, in particular $s_I \geq 15 \cdot s_L$ and in particular $s_I \geq 20 \cdot s_L$.

In particular, the layer thickness $s_I$ is less than an outside diameter D of the conveying line 6. In particular: $s_I \leq 0.6 \cdot D$, in particular $s_I \leq 0.2 \cdot D$ and in particular $s_I \leq 0.1 \cdot D$.

According to the illustrative embodiment shown, individual sections of the conveying line 6 are embodied without thermal insulating elements 26. In particular, pipe bends 28 are embodied without thermal insulating elements 26.

The conveying line 6 has a target section 29, which is adjacent to the target location 16. The target section 29 has a target section length $l_Z$. The target section length $l_Z$ is determined in such a way that a conveying pressure difference $\Delta p_F$, $l_Z$ along the target section 29 does not exceed a defined maximum value. According to the illustrative embodiment shown, the defined maximum value is at most 30% of the total conveying pressure $p_F$. The total conveying pressure is the conveying pressure with which the conveying gas 14 is fed to the conveying line 6 by the compressed air line 12 at the feed location 7. The conveying pressure difference is the result of the difference between the conveying pressure at the start of the target section $p_{FA}$ and the conveying pressure at the end of the target section 29 $p_{FE}$.

By virtue of the fact that the condensation tempering unit 15a is deliberately dispensed within the target section 29, liquid can evaporate in the conveying gas 14. Condensate formation is thereby reduced and, in particular, prevented. The risk that liquid will reach the target location 16, in particular will get into the target receptacles 17, is reduced and, in particular, prevented.

Figure 7:
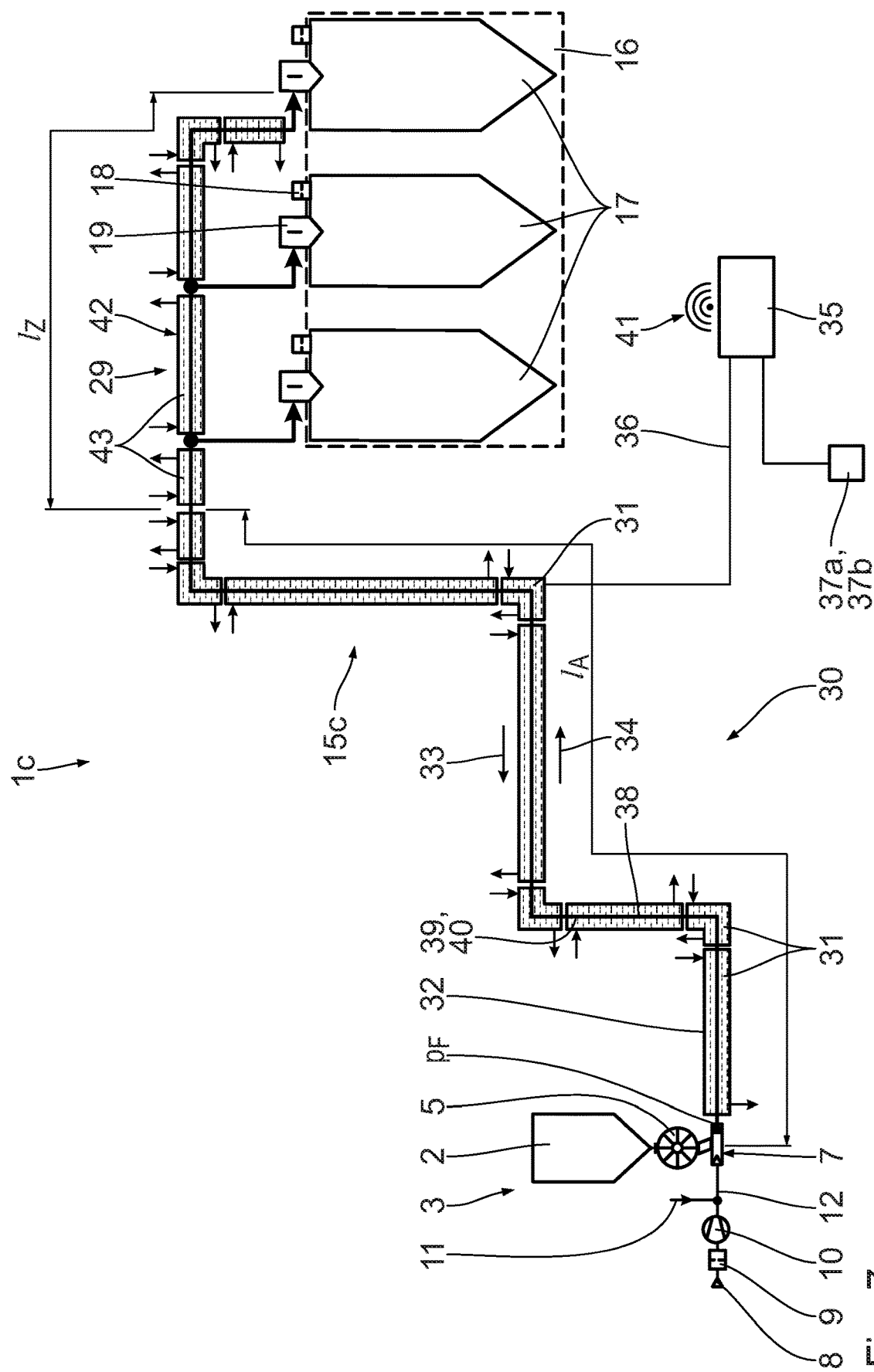
FIG. 7 shows an illustration, corresponding to FIG. 1, of a conveying system according to another embodiment having active cooling elements for the condensation tempering unit and having an evaporation tempering unit.

In addition or as an alternative, an evaporation tempering unit 42 can be provided in the target section 29, said unit being explained in greater detail below by means of the embodiment shown in FIG. 7.

In conveying system 1a, the condensation tempering unit 15a is arranged along the conveying line 6, along an initial section 30. The initial section 30 begins at the feed location 7 and extends as far as the target section 29. According to the illustrative embodiment shown, the conveying line 6 consists exclusively of the initial section 30 and the target section 29. The conveying line 6 has a total length $l_{ges}$ which corresponds to the sum of the initial section length $l_A$ and the target section length $l_Z$.

Figure 6:
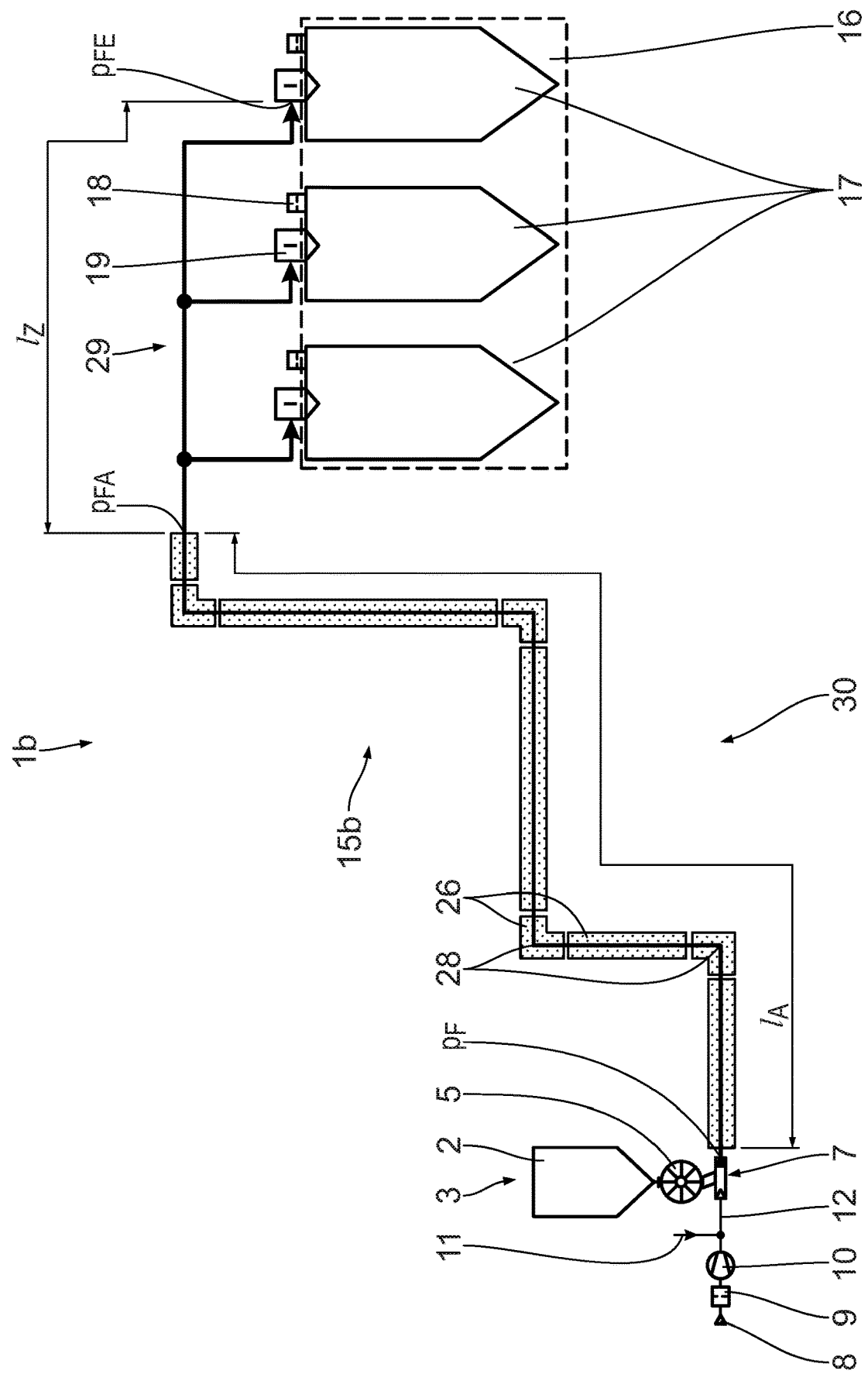
FIG. 6 shows an illustration, corresponding to FIG. 1, of a conveying system according to another embodiment having passive elements.

Another embodiment is described below with reference to FIG. 6. Parts of identical design are given the same reference signs as in the previous embodiments, to the description of which attention is drawn herewith. Parts that are different in design but functionally similar are given the same reference signs followed by b.

One significant difference with respect to the previous embodiments is that the condensation tempering unit 15b is embodied in such a way that the conveying line 6 is substantially fully insulated by means of insulating elements 26 within the initial section 30. In particular, insulating elements 26 are also arranged at pipe bends 28.

In addition or as an alternative, an evaporation tempering unit 42 can be provided in the target section 29, said unit being explained in greater detail below by means of the embodiment shown in FIG. 7.

Another embodiment is described below with reference to FIG. 7. Parts of identical design are given the same reference signs as in the previous embodiments, to the description of which attention is drawn herewith. Parts that are different in design but functionally similar are given the same reference signs followed by c.

One significant difference with respect to the previous embodiments is that the condensation tempering unit 15c has active elements in the form of active cooling elements 31. The active cooling element 31 is embodied as a double tube apparatus, having an additional tube 32, which is arranged concentrically with the conveying line 6. A cooling liquid, in particular water, in the interspace between the additional tube 32 and the conveying line 6 can be used to cool the external wall 27 of the conveying line 6. Cooling liquid is fed into and discharged from the interspace in such a way that the flow direction 33 of the cooling liquid is oriented counter to the conveying direction 34 of plastic granulate 13 and conveying gas 14. The active cooling element 31 is operated by the countercurrent method.

By means of the active cooling elements 31, the heat dissipation at the external wall 27 of the conveying line 6 can be selectively influenced. In particular, adapted heat dissipation in accordance with the conveying conditions and/or the external environmental conditions is possible. In particular, the heat dissipation which is made possible by means of an active cooling element 31 can be influenced by means of the temperature of the cooling liquid and/or the flow rate of the cooling liquid.

Conveying system 1c furthermore has a schematically illustrated control unit 35. The control unit 35 allows the control of the temperature $T_{IW}$ at the internal wall 23 of the conveying line 6. The control unit is in signal communication, in particular, with the condensation tempering unit 15c, in particular with the active cooling elements 31. For reasons of illustration, this signal link 36 is illustrated schematically for just one of the active cooling elements 31 in FIG. 7.

Moreover, the control unit 35 is in signal communication with an ambient temperature sensor 37a and with an ambient humidity sensor 37b.

The control unit 35 is furthermore in signal communication with a pipe wall temperature sensor 38 and a conveying gas temperature sensor 39. The pipe wall temperature sensor 38 is used to measure the temperature $T_{IW}$ at the internal wall 23 of the conveying line 6. The pipe wall temperature sensor 38 can be arranged on the external wall 27 or on the internal wall 23 of the conveying line 6.

The control unit 35 is furthermore in signal communication with at least one sensor 40 for measuring the relative humidity of the conveying gas 14. A plurality of humidity sensors 40 can be provided along the conveying line 6. The conveying gas temperature sensor 39 and the at least one humidity sensor 40 are arranged within the conveying line 6 and/or in the compressed air line 12, between the pressure generator 10 and the feed location 7.

The signal link between the control unit 35 and the sensors 38, 39, 49 can be embodied in a wired manner but can also be embodied wirelessly. The wired signal links are not shown in FIG. 7 for reasons of illustration. Wireless signal links are characterized by the schematic radio communication symbol 41 in FIG. 7.

Depending on the measured values for the ambient temperature, the temperature $T_{IW}$ at the internal wall 23, the temperature $T_F$ of the conveying flow and the relative humidity of the conveying gas, a setpoint value for the temperature $T_{IW}$ at the internal wall 23 is determined in the control unit 35 and correspondingly influenced by an actuating signal to the active cooling elements 31. By means of the control unit 35 and the signal links 36, 41, there is the possibility, in particular, of a closed control loop in order to ensure constant sliding film formation on the internal wall 23.

It is possible to provide the conveying system section by section with separate sensors, which are each independently in signal communication with the control unit 35. As a result, the various sections of the conveying system 1 can be controlled independently of one another. It is thereby possible to set the conveying conditions selectively in the various sections and, in particular, independently of the other sections of the conveying system 1.

It is conceivable to keep the temperature $T_{IW}$ at the internal wall 23 so far below the temperature $T_F$ of the conveying flow that even a small addition of liquid brings about local, pressure-induced saturation in order to induce local sliding film formation. In particular, the temperature $T_{IW}$ at the internal wall 23 is 15° K less than the temperature $T_F$ of the conveying flow, in particular less than 10° K, in particular less than 5° K and, in particular, less than 1° K. The total quantity of liquid to be added can thereby be reduced and/or the friction-reducing effect of the sliding film intensified.

In particular, it is conceivable to set the temperature difference to a level such that it is possible to dispense with a separate addition of liquid, particularly in the form of water, wherein a steady sliding film is formed on the internal wall 23 of the conveying line 6. This method is particularly advantageous since instruments for metered addition of liquid are superfluous. The outlay on apparatus is reduced. The water displaced from the sliding film can be reabsorbed by the conveying gas as soon as it heats up to the temperature $T_F$ of the conveyed material again. This takes place comparatively quickly, particularly within the conveying flow. As a result, an exchange of the conveying air ahead of the target location 16 is superfluous. Consequently, an exchange gas unit of the kind known from EP 3 366 618 A1 is superfluous. This method is suitable especially for short conveying lines 6 with which, on the one hand, only low conveying-pressure-induced supersaturation levels can be achieved and, on the other hand, the initial section within which, in particular, cooling of the conveying line 6 takes place is made relatively short.

Another difference with respect to the previous embodiments is that not only has the condensation tempering unit been dispensed with but that, in addition, an evaporation tempering unit 42 is provided in the target section 29. According to the illustrative embodiment shown, the evaporation tempering unit 42 extends along the entire length $L_Z$ of the target section 29. The evaporation tempering unit 42 has a plurality of active elements in the form of active heating elements 43. The active heating elements 43 are embodied in a manner substantially identical with the active cooling elements 31, wherein a heat transfer fluid in the form of hot water, which is guided in co-current flow and not in countercurrent flow with respect to the conveying direction 34 of the plastic granulate 13, is used instead of a coolant.

Depending on the ambient conditions, it is also conceivable to use active heating elements for the condensation tempering unit 15c instead of the active cooling elements.

By virtue of the fact that the evaporation tempering unit 42 is used in the target section 29, condensate formation in the target section 29 can be excluded even more reliably.

In particular, it is conceivable for the control unit 35 to be in signal communication with corresponding sensors 38, 39 and 40, which are then arranged in the conveying line 6 in the region of the target section 29, in order to ensure control of the temperature $T_{IW}$ at the internal wall 23 of the conveying line 6 in the target section 29.

A distribution unit, which is used for selective distribution of the sliding film 24 formed on the internal wall 23 of the conveying line 6, is explained in greater detail below with reference to FIGS. 8 and 9.

Figure 8:
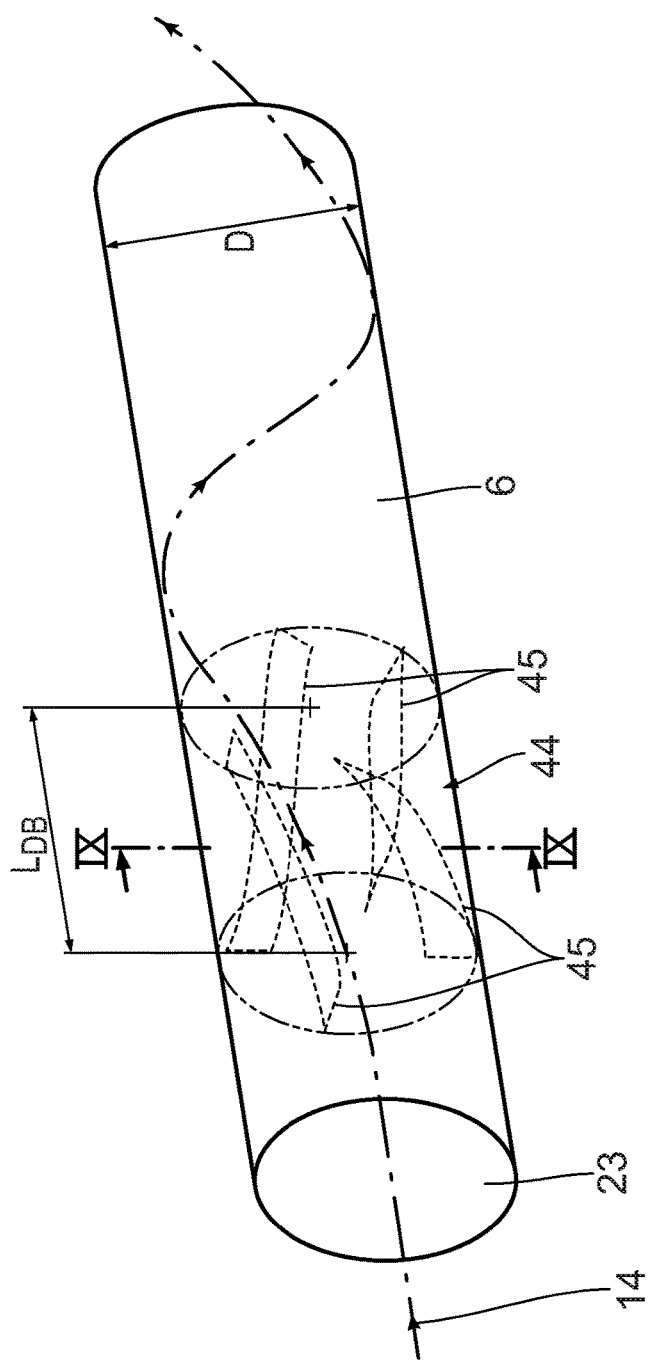
FIG. 8 shows a schematic perspective view of the conveying line with a distribution unit in the form of swirl vanes.
Figure 9:
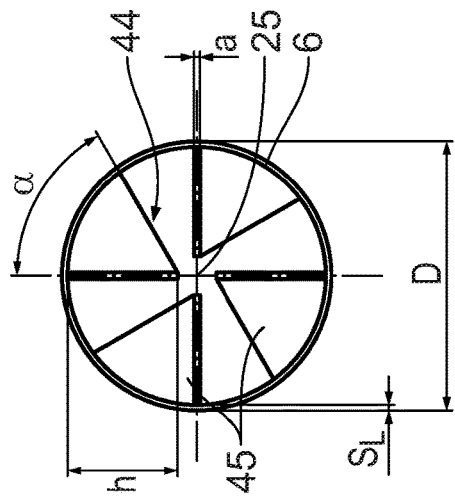
FIG. 9 shows a section according to section line IX-IX in FIG. 8.

The flow direction of the conveying gas is characterized by the flow arrow 14 in FIG. 8. The distribution unit 44 shown in FIG. 8 has a plurality of swirl vanes 45, according to the illustrative embodiment four swirl vanes. The four swirl vanes 45 are arranged at equal intervals along the circumference of the internal wall 23. The swirl vanes 45 are each embodied as sheet metal strips, which have a curvature along the longitudinal axis 25 of the conveying line 6 such that the conveying flow 14 is deflected. In particular, a helical flow direction, which extends along the internal wall 23 of the conveying line 6, is produced by the distribution unit 44 with the swirl vanes 45. This helical conveying flow is illustrated downstream of the distribution unit 44 in FIG.

8. By virtue of the helical conveying flow, the contact of the heated conveying gas with the cold internal wall 23 of the conveying line 6 is intensified, resulting in an increase in condensate formation. The distribution unit 44 causes an additional formation of the sliding film.

The swirl vanes 45 are embodied in an identical manner and are equally spaced along the circumference of the conveying line 6, i.e. are arranged at an angular spacing of 90° to one another. The distribution unit 44 can also have more than four swirl vanes 45. The distribution unit 44 can also have fewer than four swirl vanes 45, in particular precisely three swirl vanes 45, in particular precisely two swirl vanes 45 and, in particular, precisely one swirl vane 45. It is conceivable for the swirl vanes 45 of a distribution unit to be embodied differently from one another.

The swirl vanes 45 each have a sheet metal thickness a in the range of from 2 mm to 10 mm. In particular, the sheet metal thickness a is 0.5 times to 10 times the wall thickness $s_L$ of the conveying line 6, in particular 1 times to 3 times the wall thickness $s_L$.

The swirl vanes 45 each have a sheet metal height h of between 20 mm and 200 mm. It is advantageous if the sheet metal height h is 0.1 times to 0.9 times the outside diameter D of the conveying line 6, in particular 0.2 times to 0.5 times the outside diameter D.

The swirl vanes 45 have a length $L_{DB}$ of from 100 mm to 1000 mm along the conveying line 6. In particular, the length $L_{DB}$ is 1 times to 10 times the outside diameter D of the conveying line 6, in particular 2 times to 5 times the outside diameter D.

The swirl vanes 45 each have a twist angle α to generate the helical conveying flow. The twist angle α is between 10° and 180°, in particular between 30° and 90°.

In addition, the helical flow of the conveying gas brings about distribution of the sliding film on the internal wall 23.

In particular, the distribution unit 44 with the swirl vanes 45 is arranged in a rectilinear section of the conveying line, in particular in a horizontal section of the conveying line 6. Fewer than four or more than four swirl vanes 45 can be provided in the distribution unit 44.

It is particularly advantageous if the distribution unit 44 with the swirl vanes 45 is arranged along the conveying line 6 in the region of the second quarter up to the end of the last quarter of a horizontal section of the conveying line 6. Ideally, the distribution unit 44 with the swirl vanes 45 is arranged in the region of the second and third quarters of a horizontal section of the conveying line 6. The swirl vanes are advantageously arranged at an axial distance from pipeline bends 28, wherein the axial distance corresponds to 20 times to 200 times, in particular 50 times to 150 times, the outside diameter D of the conveying line 6.

Figure 10:
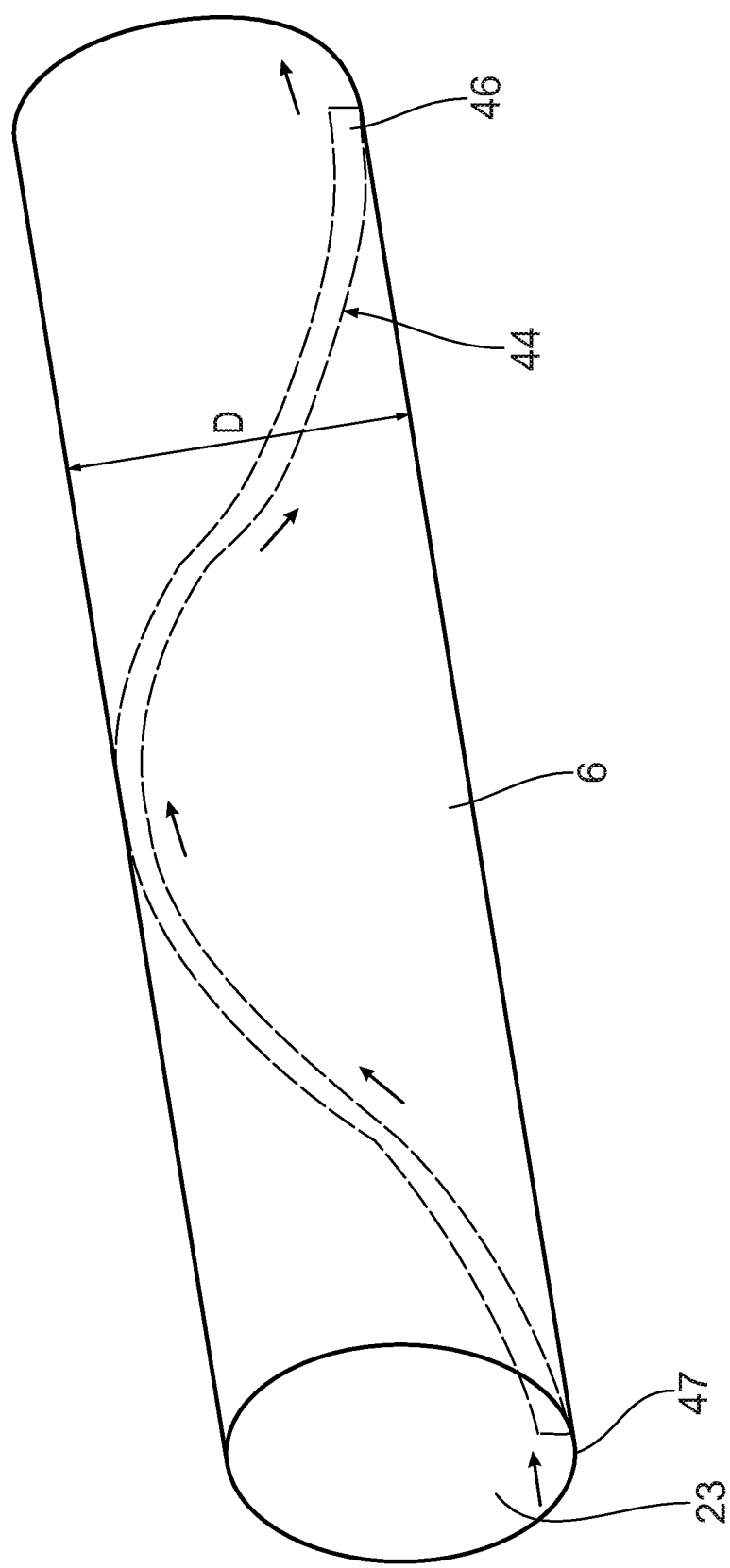
FIG. 10 shows an illustration corresponding to FIG. 8, wherein the distribution unit has a deflection element in the form of a guide groove.

Another embodiment of a distribution unit is described below with reference to FIG. 10.

According to the illustrative embodiment shown, the distribution unit 44 has a guide groove 46 in the form of an impressed feature, which is integrated in the form of a helix in the internal wall 23 of the conveying line 6. The guide groove 46 is, in particular, worked, in particular impressed, as a channel into the surface of the internal wall 23. The guide groove 46 can have a rectangular or semicircular contour.

The guide groove 46 brings about deflection of the condensed liquid on the internal wall 23, in particular from a bottom region 47 of the conveying line 6 into the conveying gas flow and/or over the circumference of the internal wall 23. It is also possible for more than one guide groove 46 to be provided. In addition or as an alternative, the distribution unit 44 can also have baffles, which bring about deflection of the liquid flow in a manner similar to the guide grooves 46. The guide grooves 46 and/or the baffles form guide elements which allows selective distribution of the liquid film produced in order to form and maintain the sliding film.

The guide elements are preferably used in straight sections of the conveying line 6, in particular in horizontal sections of the conveying line 6. A plurality of guide elements can be arranged one behind the other and/or side-by-side along the conveying line.

It is advantageous if the guide elements are arranged in the region of the second quarter up to the end of the last quarter of a horizontal section of the conveying line 6 and, in particular, in the region of the second and third quarters of the horizontal section of the conveying line 6. In particular, the guide elements are arranged at an axial distance from pipeline bends 28, wherein the axial distance corresponds to 20 times to 200 times the outside diameter D of the conveying line 6 and, in particular, 50 times to 150 times the outside diameter D.

Figure 11:
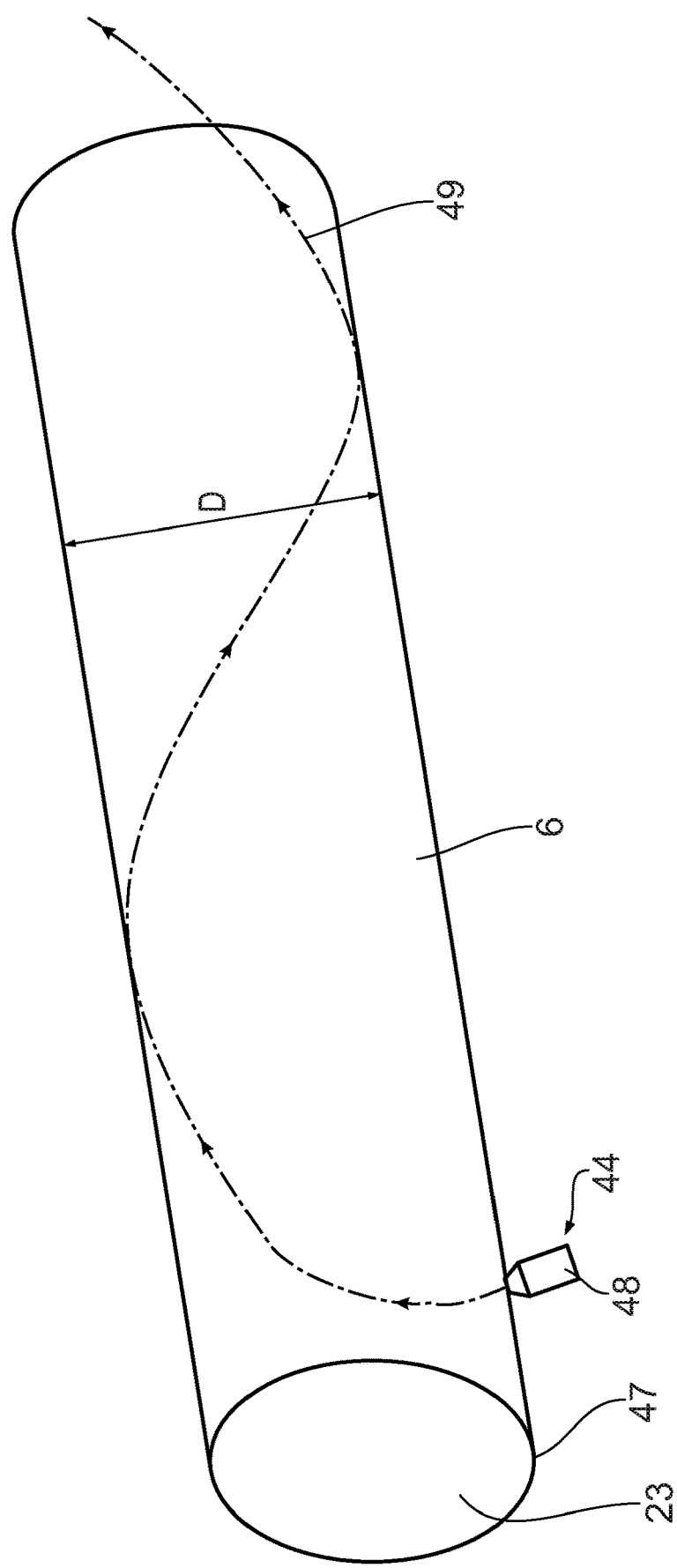
FIG. 11 shows an illustration corresponding to FIG. 8 with the distribution unit as a gas injection element.

Another embodiment of a distribution unit 44 is explained below with reference to FIG. 11.

In the illustrative embodiment shown, the distribution unit 44 has at least one gas injection element in the form of an air nozzle 48. The air nozzle 48 is coupled directly to the conveying line 6. In particular, the air nozzle 48 is connected in the bottom region 47 of the horizontally arranged conveying line 6. In particular, the air nozzle 48 is arranged substantially tangentially on the conveying line 6, with the result that the air injected into the conveying line 6 by the air nozzle 48 follows a substantially tangential flow direction along the internal wall 23 of the conveying line 6. In superposition with the flow direction of the conveying gas 14, a substantially helical flow direction, which is characterized by the flow arrow 49 in FIG. 11, results for the air injected by means of the air nozzle 48.

The injected helical air flow along the internal wall 23 of the conveying line 6 brought about an advantageous distribution of the condensed liquid and hence an improved arrangement of the sliding film. Installation of static elements within the conveying line 6 which could impair and/or hinder conveyance of the plastic is thereby avoided.

In particular, the air nozzle 48 is connected to straight sections of the conveying line 6, in particular to horizontal sections of the conveying line 6. It is conceivable to use a plurality of air nozzles 48, which can be arranged spaced apart along the longitudinal axis 25. It is also conceivable to arrange a plurality of air nozzles 48 in a plane perpendicular to the longitudinal axis 25 along the circumference of the conveying line 6.

It is advantageous if the air nozzles are arranged in the region of the second quarter up to the end of the last quarter of a horizontal section of the conveying line 6 and, in particular, in the region of the second and third quarters of the horizontal section of the conveying line 6. In particular, the air nozzles are arranged at an axial distance from pipeline bends 28, wherein the axial distance corresponds to 20 times to 200 times the outside diameter D of the conveying line 6 and, in particular, 50 times to 150 times the outside diameter D.

In the embodiments of the distribution unit 44 explained above and shown in FIGS. 8 to 11, it is additionally or alternatively conceivable for the internal wall 23 to have a hydrophilic wetting surface. Improved wetting of the internal wall 23 with the liquid is thereby achieved. A contact angle, which can also be referred to as the wetting angle, which a liquid droplet forms on the hydrophilic wetting surface is advantageously less than 90°, in particular less than 50° and, in particular, less than 10°.

For all the embodiments, it is the case that individual features can be combined in any desired manner. In particular, it is also possible for conveying systems 1, 1a and 1b to be embodied with an evaporation tempering unit 42. All the distribution units 44 can be used independently of one another in combination or individually in all the conveying systems mentioned.

What is claimed is:

1. A conveying system for pneumatically conveying plastic granulate by means of humid conveying gas, having
    a feed location, at which the plastic granulate is fed into a conveying line by pressurized conveying gas,
    a target location in conveying connection with the feed location, comprising
    a condensation tempering unit, which is arranged along one of a section and sections of the conveying line, for making the conveying line such temperature for the at least partial condensation of moisture contained in the conveying gas to form a sliding film on an internal wall of the conveying line, wherein the condensation tempering unit is arranged along the conveying line along a conveying direction between the feed location and the target location.

2. The conveying system according to claim 1, wherein the condensation tempering unit has at least one passive element.

3. The conveying system according to claim 2, wherein the at least one passive element is embodied as at least one of a shading element, as a passive cooling element and as a thermal insulating element.

4. The conveying system according to claim 1, wherein the condensation tempering unit has at least one active element.

5. The conveying system according to claim 4, wherein the at least one active element is embodied as at least one of an active heating element and as an active cooling element.

6. The conveying system according to claim 1, comprising a control unit for controlling the temperature at the internal wall of the conveying line for the formation of a sliding film.

7. The conveying system according to claim 6, wherein the control unit is in signal communication with the condensation tempering unit and with at least one of at least one temperature sensor and with a sensor for humidity measurement at least one of in the conveying line and in a pressurized gas line.

8. The conveying system according to claim 1, comprising a distribution unit for the selective distribution of the sliding film formed on the internal wall of the conveying line.

9. The conveying system according to claim 8, wherein the distribution unit is arranged in the region of the condensation tempering unit.

10. A conveying system for pneumatically conveying plastic granulate by means of humid conveying gas, having
    a feed location, at which the plastic granulate is fed into a conveying line by pressurized conveying gas,
    a target location in conveying connection with the feed location, comprising
    a condensation tempering unit, which is arranged along one of a section and sections of the conveying line, for making the conveying line such temperature for the at least partial condensation of moisture contained in the conveying gas to form a sliding film on an internal wall of the conveying line, a distribution unit for the selective distribution of the sliding film formed on the internal wall of the conveying line, wherein the distribution unit has at least one swirl vane for generating swirl in the conveying flow.

11. The conveying system according to claim 10, wherein the at least one swirl vane is arranged within the conveying line along a rectilinear section of the conveying line.

12. The conveying system according to claim 8, wherein the distribution unit has at least one deflection element for deflecting a fluid flow in the conveying line.

13. A conveying system for pneumatically conveying plastic granulate by means of humid conveying gas, having
    a feed location, at which the plastic granulate is fed into a conveying line by pressurized conveying gas,
    a target location in conveying connection with the feed location, comprising
    a condensation tempering unit, which is arranged along one of a section and sections of the conveying line, for making the conveying line such temperature for the at least partial condensation of moisture contained in the conveying gas to form a sliding film on an internal wall of the conveying line, a distribution unit for the selective distribution of the sliding film formed on the internal wall of the conveying line, wherein the distribution unit has at least one deflection element for deflecting a fluid flow in the conveying line, wherein the at least one deflection element is embodied as a baffle which is secured on the internal wall of the conveying line.

14. A conveying system for pneumatically conveying plastic granulate by means of humid conveying gas, having
    a feed location, at which the plastic granulate is fed into a conveying line by pressurized conveying gas,
    a target location in conveying connection with the feed location, comprising
    a condensation tempering unit, which is arranged along one of a section and sections of the conveying line, for making the conveying line such temperature for the at least partial condensation of moisture contained in the conveying gas to form a sliding film on an internal wall of the conveying line, a distribution unit for the selective distribution of the sliding film formed on the internal wall of the conveying line, wherein the distribution unit has at least one deflection element for deflecting a fluid flow in the conveying line, wherein the at least one deflection element is embodied as a guide groove, which is embodied in a manner integrated on the internal wall of the conveying line.

15. The conveying system according to claim 8, wherein the distribution unit has at least one gas injection element, which is connected to the conveying line for the additional injection of a gas for the distribution of the sliding film.

16. A conveying system for pneumatically conveying plastic granulate by means of humid conveying gas, having
    a feed location, at which the plastic granulate is fed into a conveying line by pressurized conveying gas,
    a target location in conveying connection with the feed location, comprising
    a condensation tempering unit, which is arranged along one of a section and sections of the conveying line, for making the conveying line such temperature for the at least partial condensation of moisture contained in the conveying gas to form a sliding film on an internal wall of the conveying line, wherein the internal wall of the conveying line is embodied with a hydrophilic wetting surface.

17. The conveying system according to claim 1, comprising a humidification unit for humidifying at least one of the conveying gas and the plastic granulate by adding liquid.

18. The conveying system according to claim 17, wherein the liquid is added by means of a separate liquid connection.

19. A conveying system for pneumatically conveying plastic granulate by means of humid conveying gas, having
- a feed location, at which the plastic granulate is fed into a conveying line by pressurized conveying gas,
- a target location in conveying connection with the feed location, comprising
- a condensation tempering unit, which is arranged along one of a section and sections of the conveying line, for making the conveying line such temperature for the at least partial condensation of moisture contained in the conveying gas to form a sliding film on an internal wall of the conveying line,
- a humidification unit to humidify at least one of the conveying gas and the plastic granulate.

20. A conveying system for pneumatically conveying plastic granulate by means of humid conveying gas, having
- a feed location, at which the plastic granulate is fed into a conveying line by pressurized conveying gas,
- a target location in conveying connection with the feed location, comprising
- a condensation tempering unit, which is arranged along one of a section and sections of the conveying line, for making the conveying line such temperature for the at least partial condensation of moisture contained in the conveying gas to form a sliding film on an internal wall of the conveying line, wherein the condensation tempering unit extends along the conveying line over at least 20% of the total length of the conveying line.

* * * * *